UnitedStates Patent Office 3,487,029
Patented Dec. 30, 1969

3,487,029
INCREASING POLYMERIZATION RATE OF ALKENE OXIDES WITH ALKYLENE CARBONATES
Henry L. Hsieh, Bartlesville, Okla., assignor to Phillips Petroleum Company, a corporation of Delaware
No Drawing. Filed Jan. 29, 1968, Ser. No. 701,047
Int. Cl. C08g 23/14
U.S. Cl. 260—2
8 Claims

ABSTRACT OF THE DISCLOSURE

In the polymerization of alkene oxides in the presence of a catalyst system comprising an organoaluminum compound and water, the polymerization rate is increased by including an alkylene carbonate in the polymerization mixture.

---

This invention relates to an improved process for polymerizing alkene oxides. In another aspect the invention relates to an improved process for polymerizing alkene oxides in the presence of a catalyst system comprising an organoaluminum compound and water.

Alkene oxides can be polymerized with catalyst systems comprising an organoaluminum compound and water. The polymerization takes place in an inert hydrocarbon or ether diluent.

It is an object of this invention to provide an improved process for the polymerization of an alkene oxide. It is another object of this invention to provide a process for increasing the polymerization rate of said alkene oxide. It is a further object of this invention to provide an improved method for polymerizing alkene oxides with a catalyst system comprising an organoaluminum and water.

Other aspects, advantages and objects of this invention will be apparent to those skilled in the art from the following disclosure and claims.

It has been discovered that in the polymerization of alkene oxides in the presence of a catalyst system comprising an organoaluminum compound and water, the polymerization rate is increased by including an alkylene carbonate in the polymerization mixture. The addition of the alkylene carbonate makes possible a higher conversion of monomer into polymer in a given time than is possible in the absence of the carbonate.

The alkene oxides that can be polymerized by the process of this invention are cyclic oxides having three- or four-membered rings and containing up to and including 20 carbon atoms per molecule. These cyclic oxides are represented by the following formula:

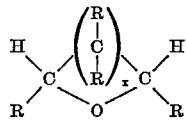

wherein $x$ can be 0 or 1 and each R is hydrogen, halogen, alkyl, alkenyl, cycloalkyl, cycloalkenyl, aryl or combinations thereof such as aralkyl or alkaryl, or such radicals contianing halogen amino or alkoxy susbtituents, each R containing up to 10 carbon atoms, and the total carbon atoms in the molecule being from 2 to 18, inclusive, preferably 2 to 8. The R radicals in a given formula can be the same or different. A single alkene oxide or a mixture of two or more alkene oxides can be polymerized.

Examples of three-member ring alkene oxides, referred to as oxiranes, that are used in this process are ethylene oxide, 1,2-epoxypropane, 1,2-epoxy-butane, 2-methyl-1,2-epoxypropane, 1-chloro-2,3-epoxypropane, 1-bromo-2,3-epoxypropane, trifluoromethylethylene oxide, perfluoropropylene oxide, chloroepoxyethane, 1-chloro-3,4-epoxybutane, 1,1-dichloro-2,3-epoxypropane, cyclohexene oxide, epoxyethers such as methyl glycidyl ether, isopropyl glycidyl ether, phenyl glycidyl ether, 3-chlorophenyl glycidyl ether, 2-chloroethyl glycidyl ether, styrene oxide, 1-dimethylamino-2,3-epoxypropane, butadiene monoxide, and the like. This process is particularly useful to polymerize the oxiranes.

Examples of four-member ring alkene oxides known as oxetanes are 3,3-bis(chloromethyl)oxetane, 3,3-bis(fluoromethyl)oxetane, 3,3-bis(bromomethyl)oxetane, 3,3-dimethyloxetane, 3-ethyloxetane, 2-methyloxetane, 2,4-diethyloxetane, 2-ethyl-3-propyloxetane and the like.

The organoaluminum compounds which can be used as a catalyst component for the polymerization of alkene oxides in accordance with this invention can be defined as a triorganoaluminum, organoaluminum monohalide, organoaluminum monohydride, organoaluminum dihalide, or organoaluminum dihydride. Mixtures of the organoaluminum compounds can be used, including organoaluminum sesquihalides.

The organoaluminum compounds can be represented by the formula $R'_n AlX_m$ wherein $R'$ is a hydrocarbon radical containing from 1 to 20 carbon atoms selected from the group consisting of alkyl, cycloalkyl, aryl, and combinations thereof, such as alkaryl, aralkyl, cycloalkylalkyl, and the like; X is selected from the group consisting of hydrogen, chlorine, bromine, fluorine, and iodine; $n$ is an integer from 1 to 3, inclusive; $m$ is an integer from 0 to 2, inclusive; and the sum of the integers $n$ and $m$ equals 3. Triorganoaluminum compounds where $n$ is 3 and $m$ is 0 are the preferred organoaluminum compounds.

The mol ratio of water to organoaluminum compound is in the range of 0.02 to 1.6, preferably 0.1 to 1, mols of water per mol of organoaluminum compound. The amount of water depends to some extent upon the organoaluminum compound, the alkene oxide being polymerized, the diluent, and the polymerization temperature.

The diluent that is used in this invention is either a hydrocarbon diluent selected from the group consisting of paraffinic, cycloparaffinic, and aromatic hydrocarbons containing from about 4 to about 10 carbon atoms per molecule; or an ether containing from 2 to 10 carbon atoms; or a mixture of such diluents. Exemplary diluents which can be used include butane, pentane, hexane, decane, cyclopentane, cyclohexane, methylcyclohexane, benzene, toluene, xylene, ethylbenzene, diethyl ether, isopropyl methyl ether, tert-butyl methyl ether, and the like.

The amount of catalyst used for effecting polymerization of alkene oxides can vary over a broad range. Preferably and for convenience, the amount of catalyst is determined on the basis of the organoaluminum compound in the catalyst system. As a general rule the amount of catalyst is maintained within the range of 1 to 100 gram millimoles of organoaluminum compound per 100 grams of monomeric material being polymerized and preferably in the range of 5 to 40 gram millimoles per 100 grams of monomer.

According to this invention, an alkylene carbonate is included in the polymerization mixture, thereby increasing the rate of polymerization of the alkene oxide. The amount of alkylene carbonate employed is generally based on the total monomeric material. It depends upon the monomer or monomers being polymerized, and is ordinarily in the range of 2 to 1000 gram millimoles, preferably in the range of 5 to 300 gram millimoles per 100 grams of monomeric material. There is normally no further advantage to be gained by using more than 100 gram millimoles of the carbonate per 100 grams of monomer.

The carbonate used in the present invention can be represented by the following formula:

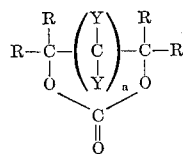

wherein $a$ is an integer of from 0 to 2, inclusive; and each R is as previously defined for the alkene oxides and each Y is selected from a group consisting of hydrogen and alkyl, cycloakyl and aryl radicals containing from 1 to 6, inclusive, carbon atoms, or such radicals containing halogen or alkoxy substituents. The Y's can be the same or different.

Examples of the carbonates which are used in the process of this invention include 1,3-dioxolane-2-one (ethylene carbonate); 4-methyl-1,3 - dioxolane - 2 - one (propylene carbonate); 4-chloro-1,3-dioxolane-2-one; 1,3-dioxane-2-one; 5,5 - diethyl-1,3 - dioxane-2-one; 4-isopropenyl-5-isopropyl-1,3-dioxane-2-one; 4,4 - diethyl-6,6-diisopropyl-1,3-dioxane-2-one; 1,3-dioxepane-2-one; 5,6-diethyl-5,6-tert-butyl-1,3-dioxepane-2-one; 4,4 - dimethyl-7,7-diisobutyl-1,3-dioxepane-2-one; 4-bromomethyl - 5,6-diethyl-1,3-dioxepane-2 - one; 4-aminomethyl - 1,3-dioxolane-2-one, and the like. Ethylene carbonate and propylene carbonate are preferred.

The polymerization reaction is generally conducted at a temperature in the range of 40 to 250° F., preferably 85 to 200° F. Polymerization is usually conducted at a pressure which will maintain the materials substantially completely in the liquid state.

The duration of the reaction depends primarily upon the temperature, pressure, and activity of the particular catalyst being used. Generally, the process is conducted for a period ranging from 5 minutes or less to 100 hours or more. A preferred range is from about 10 minutes to about 50 hours.

The various components of the total charge can be added to the reaction zone in various orders, but usually the diluent is charged first, followed by the alkene oxide monomer, the alkylene carbonate, the organometallic compound, and finally the water.

The alkene oxide polymers produced in accordance with this invention exhibit extremely good low temperature flexibility. The polymers are particularly resistant to the effects of heat and to the effects of ozone. The polymers have utility in the automobile industry for fabricating articles such as motor mounts, body mounts, suspension system parts, hoses, tubing and the like.

The advantages of this invention are further illustrated by the following examples. The reactants and their proportions and other specific conditions are presented as being typical and should not be construed to limit the invention unduly.

EXAMPLE I

The effect of propylene carbonate on the polymerization of 1-chloro-2,3-epoxypropane (epichlorohydrin) was shown by conducting the polymerization in the presence of a triisobutylaluminum-water catalyst system using toluene as the diluent. The polymerization recipe was as follows:

Epichlorohydrin, parts by weight _____ 100
Toluene, parts by weight _____ 860
Triisobutylaluminum (TBA), mhm.[1] _____ 20
Water, mhm.[1] _____ 16
Propylene carbonate, mhm.[1] _____ Variable
Water:TBA mol ratio _____ 0.8:1
Temperature, °F. _____ 158
Time, hours _____ 16

[1] Mhm.=gram millimoles per 100 grams monomer.

Toluene was charged to the reactor which was then purged with nitrogen. Epichlorohydrin was added, then the propylene carbonate, the triisobutylaluminum, and finally the water. One run, made without propylene carbonate, was used as a control. After a 16-hour polymerization period, each reaction was shortstopped with a 10 weight percent solution of 2,2'-methylene-bis(4-methyl-6-tert-butylphenol) in equal parts by weight of isopropyl alcohol and toluene using an amount sufficient to provide approxmiately one part by weight of the antioxidant per 100 parts by weight of the polymer. The polymer was recovered by pouring the mixture into isopropyl alcohol after which the polymer was separated and dried. The following results were obtained:

| Run No. | Propylene Carbonate, mhm. | Conv., percent |
|---|---|---|
| 1 | 0 | 48 |
| 2 | 10 | 70 |
| 3 | 20 | 69 |

These data show that the polymerization rate was higher in the runs in which propylene carbonate was employed, thus giving a higher conversion. All products were rubbery solids.

EXAMPLE II

A series of runs was made showing the effect of propylene carbonate on the polymerization of epichlorohydrin. The catalyst system was the same as in Example I but a higher catalyst level was used. The procedure was also the same as in the preceding example. The polymerization recipe was as follows:

Epichlorohydrin, parts by weight _____ 100
Toluene, parts by weight _____ 860
Triisobutylaluminum, mhm. _____ 25
Water, mhm. _____ 20
Propylene carbonate, mhm. _____ Variable
Water:TBA mol ratio _____ 0.8:1
Temperature, °F. _____ 158
Time, hours _____ Variable The following results were obtained:

| Run No. | Propylene Carbonate, mhm. | Time, hrs. | Conv., percent |
|---|---|---|---|
| 1 | 0 | 5.5 | 55 |
| 2 | 10 | 5.5 | 66 |
| 3 | 20 | 5.5 | 68 |
| 4 | 30 | 5.5 | 69 |
| 5 | 50 | 5.5 | 72 |
| 6 | 50 | 8 | 78 |
| 7 | 75 | 8 | 83 |
| 8 | 100 | 8 | 82 |
| 9 | 200 | 8 | 77 |

The data show that a significantly higher conversion was obtained in the runs in which propylene carbonate was employed. All polymers were soft, tacky rubbery solids.

EXAMPLE III

The effect of propylene carbonate on the copolymerization of epichlorohydrin with allyl glycidyl ether is shown in the following runs. The following recipe was employed:

Epichlorohydrin, parts by weight _____ 94
Allyl glycidyl ether, parts by weight _____ 6
Toluene, parts by weight _____ 860
Triisobutylaluminum, mhm. _____ 30
Water, mhm. _____ 24
Propylene carbonate, mhm. _____ Variable
Water:TBA mol ratio _____ 0.8:1
Temperature, °F. _____ 158
Time, hours _____ 16

The procedure was essentially that described in Example I. The following results were obtained:

| Propylene carbonate, mhm.: | Conv., percent |
|---|---|
| 0 | 36 |
| 25 | 52 |
| 50 | 54 |
| 100 | 55 |

These data show that the polymerization rate was higher, as evidenced by the higher conversion, in the runs in which propylene carbonate was present. All products were rubbery solids.

As will be apparent to those skilled in the art, other embodiments and variations can be made in this invention without departing from the spirit or scope thereof.

What is claimed is:

1. In a method for polymerizing at least one alkene oxide of the formula:

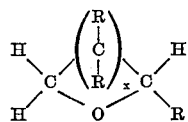

where $x$ can be 0 or 1 and each R is hydrogen, halogen, alkyl, alkenyl, cycloalkyl, cycloalkenyl, aryl or combinations thereof, or such radicals containing halogen, amine or alkoxy substituents, each R containing up to 10 carbon atoms, and the total carbon atoms in the molecule being from 2 to 18, inclusive, in a polymerization mixture containing a diluent and a catalyst system which forms on mixing materials comprising at least one organoaluminum compound of the formula:

$$R'_m AlX_n$$

wherein R' is a hydrocarbon radical selected from the group consisting of alkyl, cycloalkyl, and aryl radicals and combinations thereof containing from 1 to 20 carbon atoms, inclusive; X is a member of the class of hydrogen, chlorine, bromine, fluorine, and iodine; $n$ is an integer from 1 to 3, inclusive; $m$ is an integer from 0 to 2, inclusive; and the sum of the integers $n$ and $m$ equals 3; and water in a mol ratio of 0.02 to 1.6 gram mols of water per gram mole of organoaluminum compound, the improvement of including in said mixture an alkylene carbonate.

2. The method of claim 1 wherein said alkylene carbonate has the following structural formula:

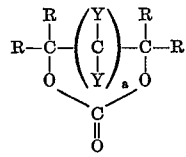

wherein $a$ is 0, 1 or 2, each R is as defined for the alkene oxides; and each Y is hydrogen, or alkyl, cycloalkyl, or aryl radicals containing from 1 to 6, inclusive, carbon atoms, or such radicals containing halogen or alkoxy substituents.

3. The method of claim 2 wherein the amount of said organic carbonate employed is in the range of 2 to 1000 gram millimoles per 100 grams of said alkene oxide.

4. The method of claim 3 wherein said diluent is selected from (a) a group of hydrocarbons consisting of paraffinic, cycloparaffinic, and aromatic hydrocarbons containing from about 4 to about 10 carbon atoms per molecule, (b) a group of ethers containing from 2 to 10 carbon atoms, or (c) a mixture of diluents selected from (a) and (b).

5. The method of claim 4 wherein said alkylene carbonate is propylene carbonate.

6. The method of claim 5 wherein said alkene oxide is epichlorohydrin.

7. The method of claim 5 wherein said alkene oxides comprise a mixture of allyl glycidyl ether and epichlorohydrin.

8. The method of claim 7 wherein said organoaluminum compound is triisobutylaluminum.

References Cited

UNITED STATES PATENTS

| 3,135,705 | 6/1964 | Vandenberg. |
| 3,284,374 | 11/1966 | Daimon et al. |

OTHER REFERENCES

Polymerization of Aldehydes and Oxides, Furukawa, 1963, pp. 242–245, relied on.

WILLIAM H. SHORT, Primary Examiner

T. PERTILLA, Assistant Examiner

U.S. Cl. X.R.

260—47, 88.3